July 16, 1963 E. W. SCHOEFFEL 3,097,988
PROCESS FOR REGENERATING BLACK LIQUOR
Filed Nov. 12, 1958
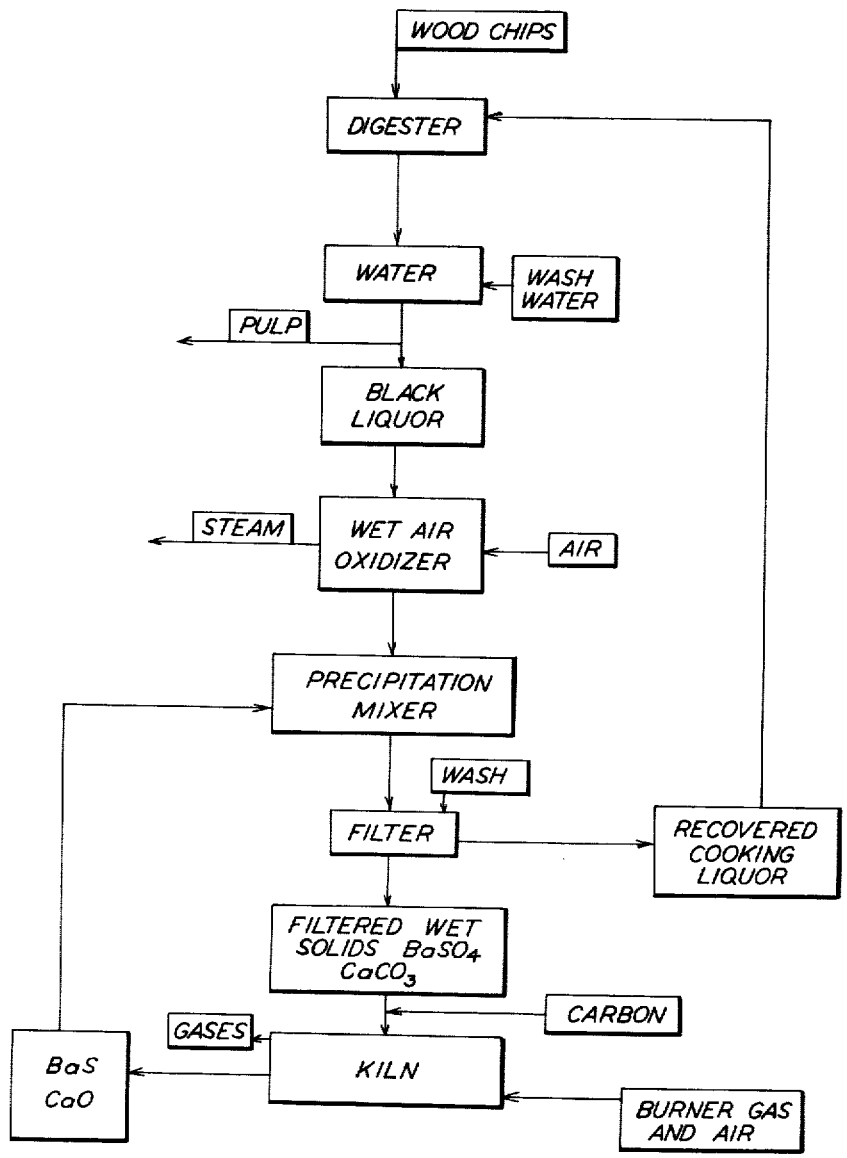
INVENTOR.
EUGENE W. SCHOEFFEL
BY Dean Laurence
ATTORNEY

United States Patent Office 3,097,988
Patented July 16, 1963

3,097,988
PROCESS FOR REGENERATING BLACK LIQUOR
Eugene W. Schoeffel, Kronenwetter, Wis., assignor to Sterling Drug Inc., New York, N.Y., a corporation of Delaware
Filed Nov. 12, 1958, Ser. No. 773,252
3 Claims. (Cl. 162—31)

The present invention relates to a process for converting a mixture of barium sulfate and certain carbonates to produce a mixture of barium sulfide and oxides.

Many industrial wastes and filtrates are aqueous solutions containing great amounts of dissolved sodium carbonate and sodium sulfate. It is desired to convert these wastes and filtrates to solutions of sodium sulfide and sodium hydroxide which can be used again in the industrial process. For example, in U.S. Patent No. 2,774,665 to Schoeffel et al., it is disclosed that alkaline sodium sulfide solutions are used in the preparation of wood pulp by the Kraft and other alkaline sulfate processes. In these processes wood chips are cooked with a solution containing sodium hydroxide, sodium carbonate and sodium sulfide, the proportions of each depending upon the grade of pulp desired. After the pulping step, the pulp is separated from the spent liquor, known as "black liquor." The "black liquor" contains organic matter, alkalies, sulfides, carbonates, thiosulfates, sulfates and miscellaneous sulfur acid salts. The "black liquor" is next oxidized by a process of flameless combustion according to the process disclosed in U.S. Patent 2,665,249 to F. J. Zimmermann. Hot steam and gases are removed during the process of flameless combustion leaving an oxidized liquor containing principally sodium carbonate and sodium sulfate as dissolved substances. Next, the oxidized liquor is treated with lime to precipitate calcium carbonate and form sodium hydroxide in the liquor. The calcium carbonate is filtered and passed to a kiln where it is roasted to convert it to lime. The lime is then recycled to treat oxidized liquor. The filtrate from the precipitated calcium carbonate is treated with barium sulfide to form soluble sodium sulfide and precipitate barium sulfate. The precipitated barium sulfate is filtered and passed to a kiln where it is roasted with carbon to form barium sulfide and carbon monoxide. The barium sulfide is recycled to treat oxidized liquor. Another process for treating spent liquor from kraft wood pulp is disclosed in U.S. Patent No. 2,072,177 to Moore. In this process, the spent liquor is smelted and the smelted product dissolved to produce a solution containing sodium sulfide, sodium carbonate and sodium sulfate. The solution is causticized with lime with resultant precipitation of calcium carbonate. The precipitated calcium carbonate is roasted in a kiln to regenerate lime. The solution is next further causticized with an excess of barium sulfide and barium hydroxide with resultant precipitation of barium sulfate and barium carbonate. The precipitated barium sulfate and barium carbonate are roasted in a kiln to regenerate barium sulfide and barium hydroxide.

In the kilning of calcium carbonate, various factors are involved for achieving efficiency. If too high temperature is employed for too long a period of time, "deadburned" lime is formed, which is relatively inert and will not form calcium hydroxide. The formation of "deadburned" lime must be avoided because it cannot be successfully used to treat the solutions of sodium carbonate and sodium sulfate described above. On the other hand, if too low a temperature is employed, the calcium carbonate will be incompletely converted to lime. In this case, only part of the kilned product will be effective as a precipitating agent in the treatment of solutions of sodium carbonate and sodium sulfate.

The present invention resides in the concept of a process of heating in one single reaction zone, such as a kiln at a temperature between about 700 degrees centigrade and 1150 degrees centigrade, a mixture including barium sulfate, barium carbonate, calcium carbonate, calcium hydroxide and a reducing agent to produce calcium oxide and barium sulfide, whereby economical, efficient operation is obtained.

In the process of the invention, an advantage is that the regeneration of the barium sulfide and calcium oxide is carried out in a single reactor, resulting in less cost than prior systems involving the separate regeneration of the barium sulfide and calcium oxide.

A further advantage of the process of the invention is that a higher conversion of barium sulfate to barium sulfide is obtained than when the barium sulfate is reduced separately from the roasting of the calcium carbonate.

In heating the materials in the process of the invention, the temperature must be maintained between the critical limits of about 700 degrees centigrade and 1150 degrees centigrade. If a temperature below 700 degrees centigrade is used, the calcium carbonate will not be converted to calcium oxide. On the other hand, if a temperature above 1150 degrees centigrade is used, "deadburned" lime, unsatisfactory for use in the treatment of oxidized liquor, is obtained.

The term "reducing agent," as used herein, means a substance capable of reducing barium sulfate to barium sulfide and is illustrated by the following: a mixture of carbon and water; carbon monoxide; hydrogen gas; a mixture of carbon monoxide and hydrogen gas; methane; and the like.

Where carbon is employed in the process, water must be present. It is believed that the first reaction is between carbon and water to produce a mixture of carbon monoxide and hydrogen gas and the hydrogen gas and carbon monoxide then reduce the barium sulfate to barium sulfide. Such reaction can be expressed by the following equation:

$$CaCO_3 + BaSO_4 + 4C + 2H_2O \rightarrow CaO + BaS + 3CO_2 + 2CO + 2H_2$$

When the carbon is employed in the process of the invention, water is provided in the damp mixture of calcium carbonate and barium sulfate. Additional water is provided by the combustion of the burner gas or fuel oil that is supplied to the kiln. Only sufficient oxygen is supplied to the kiln to burn the burner gas, as methane, or fuel oil.

When a mixture of carbon and water is employed, the carbon serves to produce complete conversion of the calcium carbonate to lime, and to reduce the barium sulfate to barium sulfide. The water forms the hydrogen gas that serves as a reducing atmosphere to facilitate the reduction of the barium sulfate to barium sulfide.

In the process of the invention, other carbonates can be employed in place of calcium carbonate as the full equivalents thereof. Such carbonates are barium carbonate, magnesium carbonate and strontium carbonate.

A mode of physical attainment of the invention is diagrammatically illustrated in the attached flow sheet illustrating a kraft wood pulping process employing the process of the invention.

Following is an example of the process of the invention according to the attached flow sheet. Add about 2000 pounds of wood chips to the digester. Flow into the digester 2200 gallons of cooking liquor containing water and the following dissolved materials: 202 pounds of dissolved sodium sulfide, 612 pounds of dissolved sodium hydroxide, 90 pounds of dissolved sodium carbonate, and 92 pounds of dissolved sodium sulfate. Heat the digester to cook the wood chips into a pulp. Pass the cooked mixture to the washer. Wash the pulp with water. Separate the pulp from the aqueous liquor and wash water. The aqueous liquor is the black liquor and has a volume of about 2200 gallons containing 3270 pounds of chemical oxygen demand. The black liquor is next oxidized.

According to the teaching of Zimmermann Patent 2,665,249, the organic constituents of the alkaline black liquor are readily oxidized substantially completely to carbon dioxide and water by subjecting them to the action of oxygen, in the form of air or a more concentrated oxygen, at a temperature of 240 degrees centigrade, or higher, and under a pressure sufficient to maintain a large portion of the water in the liquid phase.

Flow the black liquor into the wet-air oxidizer. In the wet-air oxidizer, maintain a temperature of 285–300 degrees centigrade and a reaction pressure of approximately 1800 pounds per square inch. Pump air under pressure into the wet-air oxidizer to maintain oxidation.

Withdraw 13,700 pounds of steam and gases from the wet-air oxidizer. Withdraw from the wet-air oxidizer 1070 gallons of oxidized black liquor containing 460 pounds of dissolved sodium sulfate, 902 pounds of dissolved sodium carbonate, and 8948 pounds of water. Add 85 gallons of water to make a total mixture of 1245 gallons. Pass this total mixture to the precipitation mixer. To the precipitation mixer, add a mixture of 438 pounds of barium sulfide, 100 pounds of barium carbonate and 476 pounds of calcium oxide. Mix the materials in the precipitation mixer and then pass them to the filter. Wash the filtered solids with 1043 gallons of water. Add the wash to the filtrate. The combined filtrate and washings has a volume of 2200 gallons. This a recovered cooking liquor and contains the following materials dissolved in water: 202 pounds of sodium sulfide, 612 pounds of sodium hydroxide, 90 pounds of sodium carbonate, and 92 pounds of sodium sulfate. Recycle this recovered cooking liquor to the digester for treatment of additional wood chips.

Pass the wet filtered solids to a kiln. Add carbon to the wet filtered solids before passing the mixture into the kiln. The kiln feed contains 604 pounds of barium sulfate, 100 pounds of barium carbonate, 765 pounds of calcium carbonate, 63 pounds of calcium hydroxide, 658 pounds of water, 108 pounds of carbon, and 124 pounds of petroleum coke. Inject a mixture of burner gas and sufficient oxygen to burn the burner gas into the kiln. Ignite the burner gas and regulate the flow of gas to maintain the temperature in the kiln at about 850 degress centigrade. Hold the mixture in the kiln for about 100 minutes. Vent from the kiln gasses containing hydrogen and about 216 pounds of carbon monoxide and 658 pounds of steam.

Remove from the kiln the solid product comprising 438 pounds of barium sulfide, 100 pounds of barium carbonate, and 476 pounds of calcium oxide. This product represents substantially quantitative conversion of barium sulfate to barium sulfide. Pass this mixture of precipitants to the precipitation mixer.

It is thus seen that the invention provides a process for economically regenerating precipitants in one single kiln that substantially quantitatively regenerates a mixture of barium sulfide and calcium oxide.

The invention can be embodied in other specific forms without departing from the spirit or essential characteristics thereof. The foregoing physical embodiment is therefore to be considered in all respects illustrative and not restrictive. The scope of the invention is indicated by the appended claims rather than by the foregoing description. All changes which come within the meaning and range of equivalency of the claims are therefore intended to be embraced therein.

I claim:

1. A process for regenerating an alkaline sulfide pulping liquor from black liquor containing sodium hydroxide, sodium sulfide, sodium sulfate and sodium carbonate which includes oxidizing black liquor to destroy organic matter therein and convert the sodium salts to sodium sulfate and sodium carbonate by heating under pressure sufficient to maintain at least part of the reaction mixture in the liquid phase at elevated temperature with sufficient oxygen to convert the carbon to carbon dioxide and all the hydrogen to steam; adding a recycled, previously kilned mixture of barium sulfide containing barium carbonate and calcium oxide to the resulting oxidized aqueous liquor to precipitate barium sulfate, barium carbonate, calcium hydroxide and calcium carbonate; separating said wet precipitated mixture from its supernatant liquid; adding carbon to said precipitated mixture; passing the carbon-containing mixture to a roasting zone; heating said carbon-containing mixture in said roasting zone to convert substantially quantitatively the barium sulfate to barium sulfide and the calcium hydroxide to calcium carbonate to calcium oxide; withdrawing a mixture of barium sulfide containing barium carbonate and calcium oxide from said roasting zone; and, recycling said withdrawn mixture of barium sulfide containing barium carbonate and calcium oxide to said addition step.

2. A cyclic continuous process for pulping wood which comprises: pulping wood with an alkaline sulfide pulping liquor containing at least sodium hydroxide and sodium sulfide to produce a mixture of pulp and black liquor; separating said black liquor from said pulp; oxidizing the black liquor by heating at a temperature above about 240 degrees centigrade and under sufficient pressure to maintain at least part of the reaction mixture in the liquid phase and in the presence of sufficient oxygen to convert the carbon to carbon dioxide, the hydrogen to steam, and the sodium compounds to sodium carbonate and sodium sulfate and form an aqueous oxidized liquor; adding a recycled previously-kilned mixture of barium sulfide containing barium carbonate and calcium oxide to said oxidized liquor to precipitate a wet mixture of barium sulfate and calcium carbonate; separating said precipitated wet mixture from its supernatant liquid containing sodium hydroxide, sodium sulfide, and some sodium carbonate and sodium sulfate; adding carbon to said precipitated mixture; passing the carbon-containing mixture to a roasting zone; heating said carbon-containing mixture in said roasting zone to convert substantially quantitatively the barium sulfate to barium sulfide and the calcium hydroxide calcium carbonate to calcium oxide; withdrawing a mixture of barium sulfide containing barium carbonate and calcium oxide from said roasting zone; recycling said withdrawn mixture of barium sulfide containing barium carbonate and calcium oxide to said addition step; and, recycling said supernatant liquid to said pulping step.

3. In a cyclic, continuous process for pulping wood including pulping wood with an alkaline sulfide pulping liquor containing at least sodium hydroxide and sodium sulfide to produce pulp and black liquor; oxidizing said black liquor by heating at a temperature above about 240 degrees and under sufficient pressure to maintain at least part of the reaction mixture in the liquid phase and in the presence of sufficient oxygen to convert the carbon to carbon dioxide, the hydrogen to steam, and the sodium compounds to sodium carbonate and sodium sulfate and form an oxidized liquor; and treating said oxidized liquor to regenerate an alkaline sulfide pulping liquor; the improvement comprising: adding a recycled, previously-kilned mixture of barium sulfide containing barium carbonate and calcium oxide to said oxidized liquor to precipitate barium sulfate barium carbonate, calcium hydroxide and calcium carbonate; separating said precipitated mixture from its supernatant liquid containing at least sodium hydroxide and sodium sulfide; adding carbon to said precipitated mixture; passing the carbon-containing mixture to a single roasting zone; heating said carbon-containing mixture in said single roasting zone to convert substantially quantitatively the barium sulfate to barium sulfide and the calcium hydroxide and calcium carbonate to calcium oxide; withdrawing a mixture of barium sulfide containing barium carbonate and calcium oxide from said roasting zone; recycling said withdrawn mixture of barium sulfide containing barium carbonate and calcium oxide to said addition step; and, recycling said supernatent liquid to the pulping step.

References Cited in the file of this patent

UNITED STATES PATENTS

| | | |
|---|---|---|
| 1,723,138 | Harvath | Aug. 6, 1929 |
| 1,729,428 | Lawson | Sept. 24, 1929 |
| 1,947,952 | Nitzschke | Feb. 20, 1934 |
| 2,016,529 | Windecker | Oct. 8, 1935 |
| 2,072,177 | Moore | Mar. 2, 1937 |
| 2,744,665 | Schoeffel | Dec. 18, 1956 |

OTHER REFERENCES

Mellor's Modern Inorganic Chemistry, published by Longmans, Green and Co., 1951, page 654.

UNITED STATES PATENT OFFICE

CERTIFICATE OF CORRECTION

Patent No. 3,097,988                                              July 16, 1963

Eugene W. Schoeffel

It is hereby certified that error appears in the above numbered patent requiring correction and that the said Letters Patent should read as corrected below.

Column 3, line 33, after "This" insert -- is --; line 49, for "degress" read -- degrees --; column 6, line 5, for "2,744,665" read -- 2,774,665 --.

Signed and sealed this 21st day of January 1964.

(SEAL)
Attest:

ERNEST W. SWIDER

Attesting Officer

EDWIN L. REYNOLDS

Acting Commissioner of Patents